United States Patent
Kanai et al.

[11] Patent Number: 5,872,933
[45] Date of Patent: Feb. 16, 1999

[54] APPARATUS FOR RECORDING AND/OR REPRODUCING VARIABLE BIT RATE DATA

[75] Inventors: Yuichi Kanai, Tsuruga; Kazuya Ogawa, Oogaki, both of Japan

[73] Assignee: Sanyo Electric Co., Ltd., Osaka, Japan

[21] Appl. No.: 652,716

[22] Filed: May 30, 1996

[30] Foreign Application Priority Data

May 30, 1995 [JP] Japan .................................. 7-157048

[51] Int. Cl.$^6$ ...................................................... G06F 13/00
[52] U.S. Cl. .............................. 395/200.61; 395/200.63; 395/481
[58] Field of Search ............................ 395/114, 876, 395/880, 888, 200.61, 200.63, 200.68, 481; 386/33, 42, 109, 112, 125, 126, 129; 369/13, 275.3, 280, 284

[56] References Cited

U.S. PATENT DOCUMENTS 5,463,565  10/1995  Cookson et al. .................. 364/514 R
5,576,843  11/1996  Cookson et al. .......................... 386/97

*Primary Examiner*—Thomas Peeso
*Attorney, Agent, or Firm*—Loeb & Loeb LLP

[57] ABSTRACT

A recording apparatus includes an MPEG encoder, and compressed data from the MPEG encoder and data of an index (a transfer rate and a necessary memory capacity for the transfer rate, or a transfer rate and a rate difference characteristic) are multiplexed and recorded on an optical disc. In a reproducing apparatus, a bit stream read from the optical disc is converted into variable bit rate data by a CD decoder and a CD-ROM decoder. The variable bit rate data is once stored in a system buffer, and then, supplied to an MPEG decoder from the system buffer. The index is extracted by a microcomputer which determines whether or not it is possible to reproduce the optical disc through comparison of the necessary memory capacity and a capacity of the system buffer. If not reproduced, the optical disc is ejected. In a case of simple reproduction, data stored in an output buffer is repeatedly outputted during a time that an operation of the MPEG decoder is suspended.

24 Claims, 9 Drawing Sheets

APPARATUS FOR RECORDING AND/OR REPRODUCING VARIABLE BIT RATE DATA

BACKGROUND OF THE INVENTION

1. Field of the Invention

The present invention relates to an apparatus for recording and/or reproducing variable bit rate data. More specifically, the present invention relates to a recording apparatus in which variable bit rate data being processed by MPEG2, for example, is recorded in a data storage media such as an optical disc, or a reproducing apparatus in which the variable bit rate data is reproduced from the optical disc.

2. Description of the Prior Art

An MPEG is known as an international standard for compressing digital data of a moving picture. In the MPEG, in order to increase an image quality, a variable bit rate is allowed. The variable bit rate means that a bit rate [Mbps] varies within a predetermined range as shown in FIG. 1, for example.

In an MPEG2, a compression degree, i.e. a bit rate is changed in accordance with a scene where deterioration of an image is not compricious even if the compression degree is made large or a scene where deterioration of an image is compricious if the compression degree is made large.

Such the variable bit rate data is recorded in a data storage media (DSM) such as an optical disc, for example. When the variable bit rate data in the DSM is reproduced, a buffer memory is utilized because there is a difference between a speed for reading the data from the DSM (hereinafter, called as "transfer rate") and a speed for decoding read data and the difference is not constant. More specifically, the variable bit rate data read from the DSM with a given transfer rate is once stored in a system buffer, and the data in the system buffer is read in response to a read request from a decoder (MPEG decoder, for example).

When a writing speed of the variable bit rate data into the system buffer, i.e. the transfer rate is larger than the reading speed from the system buffer, a control for reading the buffer memory is simple. That is, the reading of the data from the DSM may be suspended when the buffer memory is filled, and the reading of the data from the DSM may be restarted when a data amount within the buffer memory becomes less than a predetermined lower limit value. That is, in such a case, it is possible to always secure the data amount within the system buffer to be larger than a data amount necessary for the decoder.

In contrast, if the transfer rate is smaller than the reading speed, there is a possibility that the data amount within the memory becomes smaller than the data amount necessary for the decoder, and in such a case, resultingly, an operation of the decoder is performed intermittently.

Such a problem can be avoided by making the capacity of the buffer memory to be large. In a case where the capacity of the buffer memory is large, not only it takes a long time for storing data of a sufficient amount in the buffer memory at the beginning of reproducing but also a reproducing apparatus becomes large and a cost becomes high.

SUMMARY OF THE INVENTION

Therefore, a principal object of the present invention is to provide a novel method of recording the variable bit rate data.

Another object of the present invention is to provide a method of recording the variable bit rate data, in which the capacity of the buffer memory in the reproducing apparatus can be made smaller as possible, and it is possible to avoid a problem that the data processing is performed intermittently.

Another object of the present invention is to provide a recording apparatus implementing the above described method.

Another object of the present invention is to provide a novel apparatus for reproducing the variable bit rate data.

Another object of the present invention is to provide an apparatus for reproducing the variable bit rate data, in which it is possible to avoid a problem that data processing is performed intermittently.

In a recording apparatus according to the present invention, data of a variable bit rate is recorded in a data storage media. The recording apparatus comprises: a data output means for outputting variable bit rate data to be recorded; an index output means for outputting an index including capacity associate data associated with a necessary memory capacity based upon a transfer rate from a data storage media to a memory in a reproducing apparatus and the variable bit rate; a bit stream generating means for generating a bit stream including the index and the variable bit rate data to be recorded; and a recording means for recording the bit stream in the data storage media.

Furthermore, a method for recording data of a variable bit rate in a data storage media according to the present invention comprises steps of: (a) outputting variable bit rate data to be recorded; (b) outputting an index including capacity associate data associated with a necessary memory capacity based upon a transfer rate from a data storage media to a memory in a reproducing apparatus and the variable bit rate; (c) generating a bit stream including the index and the variable bit rate data to be recorded; and (d) recording the bit stream in the data storage media.

In an embodiment, the index includes a memory capacity by which the data processing can be performed without discontinuity and the transfer rate from the data storage media to the memory. In another embodiment, the index includes the transfer rate from the data storage media to the memory and a rate difference characteristic indicative of variation in time of a rate difference between the transfer rate and the variable bit rate. Such the index and the variable bit rate data to be recorded are multiplexed, thereby to generate the bit stream. The bit stream is recorded in the data storage media, i.e. an optical disc, for example.

In an reproducing apparatus according to the present invention, the bit steam including an index which includes associate data associated with a memory capacity and variable bit rate data is read from a data storage media, and the variable bit rate data is stored in a memory, and the variable bit rate data is read from the memory and then subjected to a data processing. The reproducing apparatus comprises: a reading means for reading the bit stream from the data storage media; an extracting means for extracting the index from the bit stream; and a judge means for judging on the basis of at least the index whether or not it is possible to reproduce the data storage media.

In a reproducing method according to the present invention, the bit stream including an index which includes associate data associated with a memory capacity and variable bit rate data is read from a data storage media, and the variable bit rate data is stored in the memory, and the variable bit rate data is read from the memory to be subjected to a data processing. The reproducing method comprises steps: (a) reading the bit steam from the data storage media; (b) extracting the index from the bit steam;

and (c) judging on the basis of at least the index whether or not the storage media can be reproduced.

The index includes a memory capacity by which the data processing can be performed without suspension and the transfer rate from the data storage media to the memory. The index may include the transfer rate from the data storage media to the memory and a rate difference characteristic indicative of variation in time of a rate difference between the transfer rate and the variable bit rate.

In a case where the index includes the memory capacity and the transfer rate, the judge means judges whether or not the data storage media can be reproduced on the basis of the memory capacity and the transfer rate included in the index and a capacity of a memory inherently provided in the reproducing apparatus and an inherent maximum transfer rate of the reproducing apparatus.

In a case where the index includes the rate difference characteristic, the judge means first calculates a necessary memory capacity and a transfer rate according to the rate difference characteristic. Then, on the basis of the memory capacity and the transfer rate both calculated and a memory capacity of a memory inherently provided in the reproducing apparatus and an inherent maximum transfer rate of the reproducing apparatus, the judge means judges whether or not it is possible to reproduce the data storage media.

If it is determined that the data storage media can be reproduced, the bit stream of the data storage media is read, whereby the variable bit rate data is transferred to the memory. The variable bit rate data stored in the memory is read, and then, subjected to the data processing at a later stage. At this time, a memory control means controls writing and reading of the memory such that the memory can not overflow and the data for the data processing can be read without discontinuity.

If it is determined that the data storage media can not be reproduced, the data storage media is ejected; however, it is possible to determine whether or not a simple reproduction is to be performed. The simple reproduction is a reproducing method in which at a time that the data processing is intermittently performed because of lack of the variable bit rate data in the memory, the data held in an output memory is repeatedly outputted during a time period that the data processing is suspended.

In accordance with the present invention, in recording the variable bit rate data in the data storage media, not only the variable bit rate data but also the index are recorded, and in reproducing the data storage media, it is determined whether or not the data storage media can be reproduced on the basis of the index, and therefore, even if the memory capacity is made small, there is no possibility that the data processing is suspended.

In addition, if the simple reproduction is adopted, even if the data storage media can not be completely reproduced, it is possible to know a content of the variable bit rate data recorded in the data storage media.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

In the following, an embodiment in which image data of a moving picture being compressed according to the MPEG2 is recorded in an optical disc (CD, DVD and etc.) and the optical disc is reproduced will be described; however, it is pointed in advance that the present invention can be applied to an apparatus and/or method for recording arbitrary variable bit rate data in a data storage media, or for reproducing variable bit rate data from a data storage media. In a case of moving picture image data, in the reproducing apparatus, the variable bit rate data transferred to a memory such as a system buffer is processed by an MPEG decoder at a later stage. In a case of another kind of variable bit rate data, the variable bit rate data can be processed according to another method.

Figure 2:
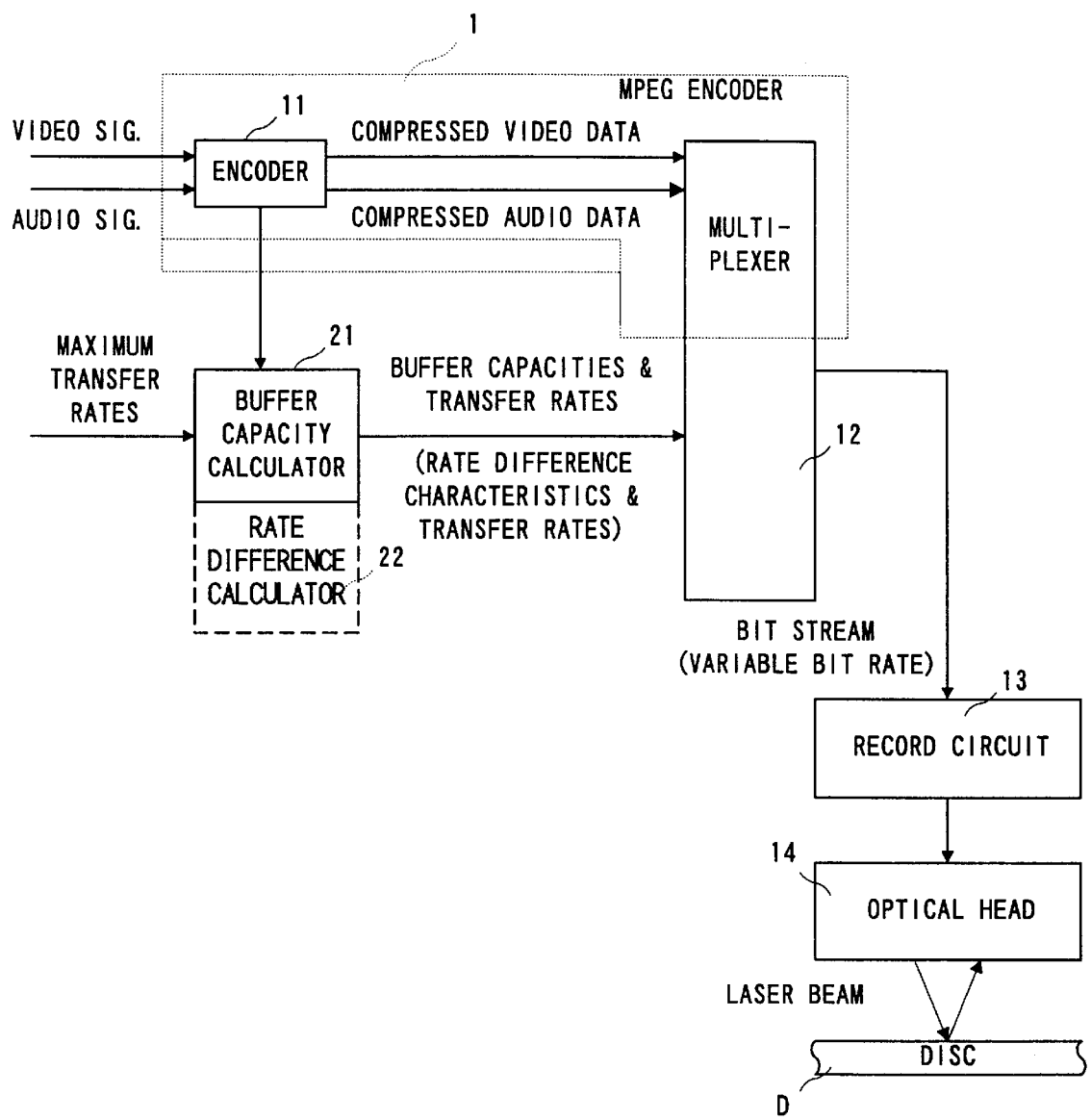
FIG. 2 is a block diagram showing one embodiment of a recording apparatus according to the present invention.

An embodiment of a recording apparatus shown in FIG. 2 includes an MPEG encoder 1 including an encoder 11 which receives an image signal and a sound signal both to be recorded and converts the image signal and the sound signal into compressed image data and compressed sound data, respectively. The compressed image data and the compressed sound data are applied to a multiplexer 12. In addition, detailed structure and operations of the encoder 11 and the multiplexer 12 in the MPEG encoder 1 are well-known, and therefore, a detailed description will be omitted here.

Figure 1:
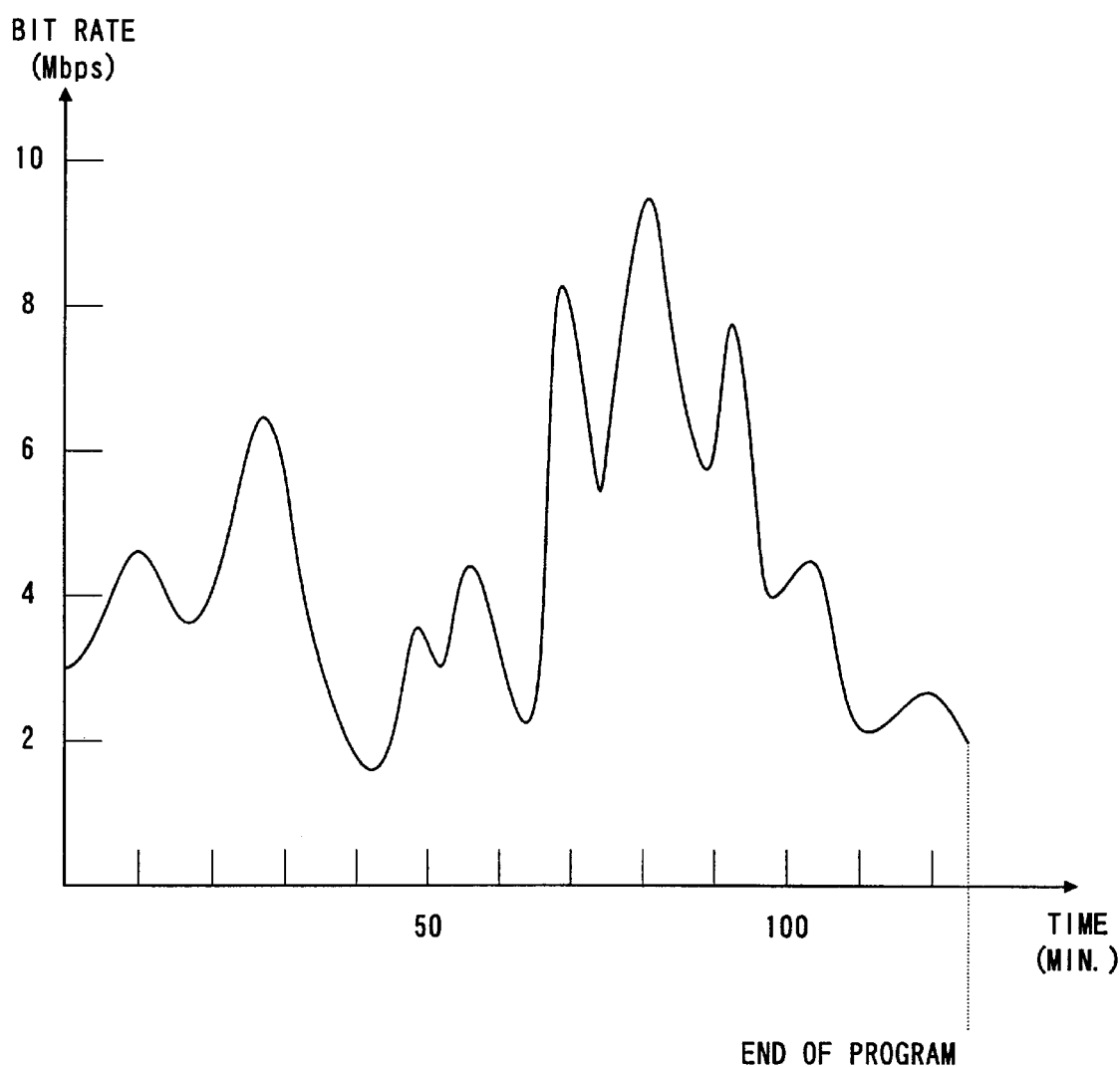
FIG. 1 is a graph showing one example of a variable bit rate, an abscissa indicating a time and an ordinate indicating a bit rate.
Figure 3:
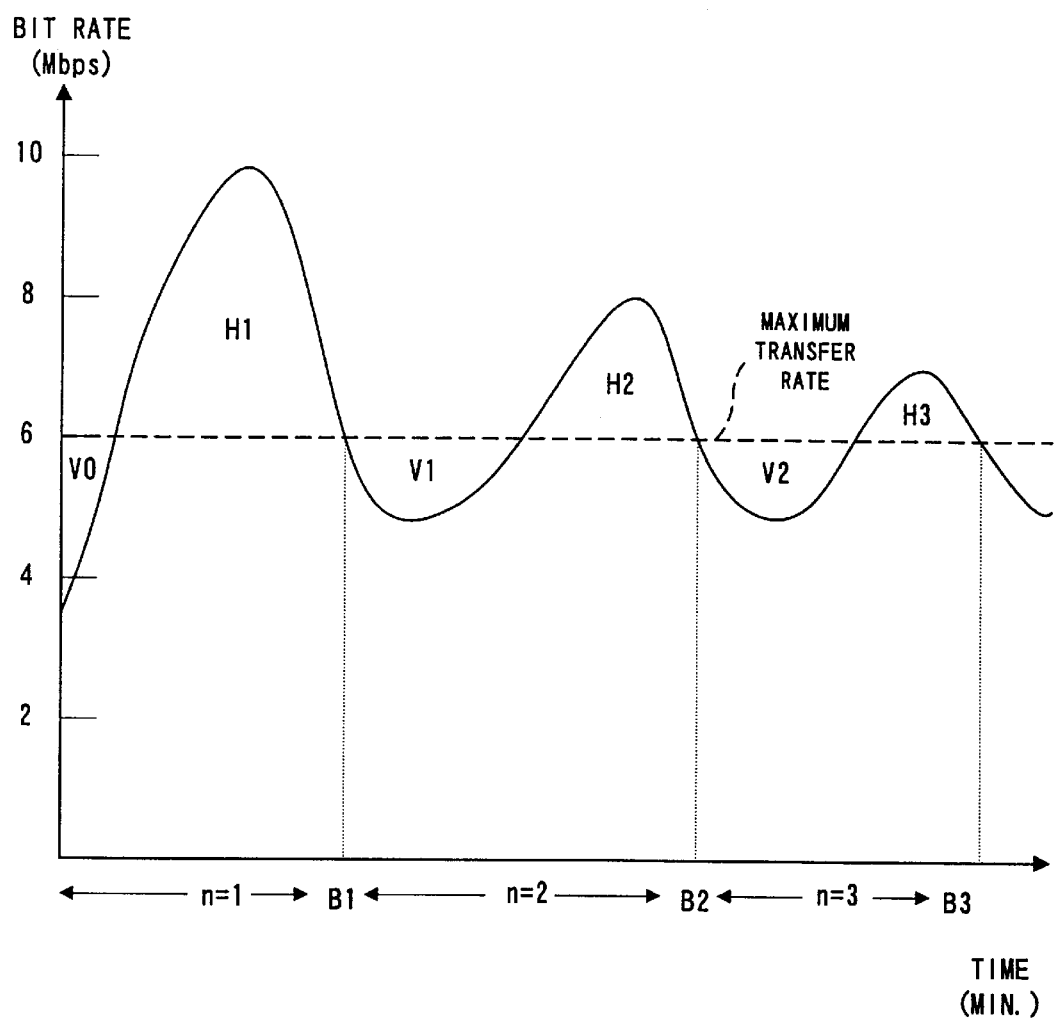
FIG. 3 is a graph utilized in calculating a necessary memory capacity, an abscissa indicating a time and an ordinate indicating a bit rate.

A bit rate of the compressed image data and the compressed sound data is sent from the encoder 11 to a buffer capacity calculator 21. The bit rate of the compressed data is a variable bit rate as shown in FIG. 1. The above described buffer capacity calculator 21 is further supplied with data indicative of a plurality of maximum transfer rates. Therefore, the buffer capacity calculator 21 calculates a buffer capacity (memory capacity) $S_n$ necessary for a reproducing apparatus (described later) for each of the plurality of maximum transfer rates in accordance with a graph shown in FIG. 3 and a following equation.

$$Sn = \sum_{i=1}^{n} Hi - \sum_{i=1}^{n} Vi$$

where, Hi is an area of a portion that the bit rate is larger than the maximum transfer rate in FIG. 3, and Vi is an area of a portion that the bit rate is smaller than the maximum transfer rate in FIG. 3. Then, "n" indicates periods shown in FIG. 3. That is, in FIG. 3, timings that the bit rate is changed from the portion H that the bit rate is larger than the maximum transfer rate to the portion that the bit rate is smaller than the maximum transfer rate are indicated by "B1", "B2", "B3", . . . , and "n" indicates a number of the periods from a proceeding timing to a succeeding timing. In addition, in FIG. 3 graph, a portion V0 that the bit rate is smaller than the maximum transfer rate can be ignored in calculating the buffer capacity or memory capacity. A reason is that a decoding operation in an MPEG decoder 80 (described later) is started at a state where a system buffer 60 (described later) is filled with the variable bit rate data.

Furthermore, a buffer capacity necessary for the decoder in fact is given by a larger one of Sn evaluated according to the above described equation and Hn in FIG. 3 because if the Sn as calculated becomes "0", a buffer capacity corresponding to a portion Hi is necessary at least.

The maximum transfer rates within a range of 3–10 [Mbps] are inputted to the buffer capacity calculator 21 with a step of 1 [Mbps], and the buffer capacity calculator 21 calculates the buffer capacity or memory capacity necessary for a reproducing apparatus for each of the maximum transfer rates in accordance with the above described equation. If the buffer capacity or memory capacity is thus calculated in corresponding to each of the plurality of maximum transfer rates, it is possible to apply the buffer capacity calculator 21 to any one of reproducing apparatuses having different maximum transfer rates. If the maximum transfer rate of a given reproducing apparatus is 5.4 [Mbps], for example, the necessary buffer capacity of 5 [Mbps] outputted from the buffer capacity calculator 21 may be referred to.

The buffer capacities and the transfer rates are thus applied to the multiplexer 12 included in the MPEG encoder 1 from the buffer capacity calculator 21. Therefore, the multiplexer 12 multiplexes the compressed image data and the compressed sound data from the encoder 11 and the buffer capacities and the transfer rates (herein after, called as "index") so as to output a bit stream with a variable bit rate. The bit stream is applied to a recording circuit 13 in which an optical head 14 is controlled to record the bit stream on an optical disc D. That is, in a data storage media, i.e. the optical disc D, not only the compressed image data and the compressed sound data but also the index (including the buffer capacities and the transfer rates) are recorded.

Figure 4:
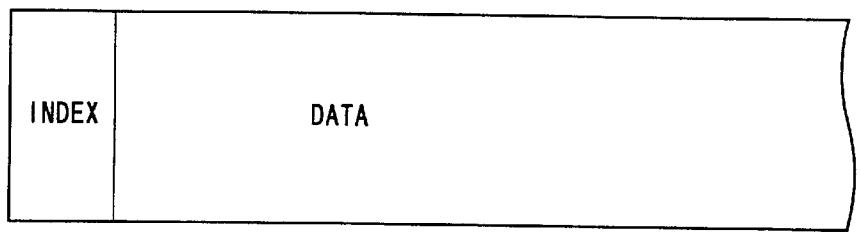
FIG. 4(A), FIG. 4(B), FIG. 4(C) are illustrative views respectively showing areas in each of which an index is recorded.
Figure 4:
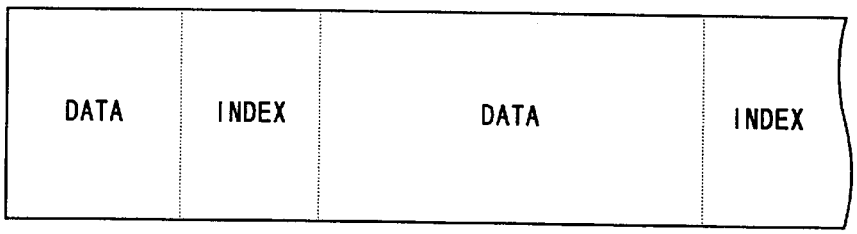
Figure 4:
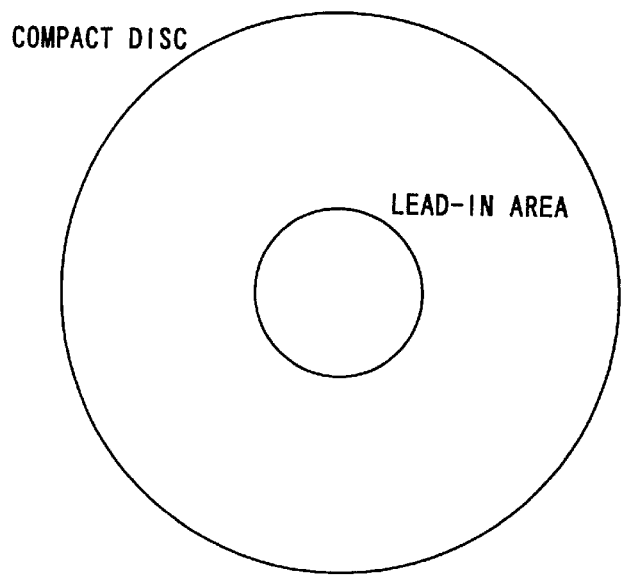

Places in each which the index is recorded are shown in FIG. 4. More specifically, in FIG. 4(A), the index is recorded at a head of each of programs or applications recorded in the data storage media. In FIG. 4(B), the index is multiplexed with data of respective programs or applications in the data storage media with constant intervals preferably. Furthermore, although not shown in FIG. 4, the index may be recorded in an area in which application information is recorded, such as a primary volume descriptor in a CD-ROM, for example. Furthermore, in a case of an optical disc shown in FIG. 4(C), the index may be recorded in a well-known lead-in area.

In addition, in the above described embodiment, the buffer capacities or memory capacities corresponding to the maximum transfer rates are calculated with utilizing the buffer capacity calculator 21, thereby to output the index data. However, as the index data, a rate difference characteristic may be further utilized. The rate difference characteristic means a characteristic indicative of variation in time of a difference between a bit rate of the variable bit rate and the transfer rate as shown in FIG. 3.

In such a case, in the recording apparatus, instead of the buffer capacity calculator 21, a rate difference calculator 22 shown by dotted line in FIG. 2 is utilized. Therefore, in this case, the rate difference characteristics and the transfer rates corresponding to the rate difference characteristics are applied from the rate difference calculator 22 to the multiplexer 12. Therefore, in the index recording places shown in FIG. 4, the index including the rate difference characteristics and the transfer rates is recorded.

Figure 5:
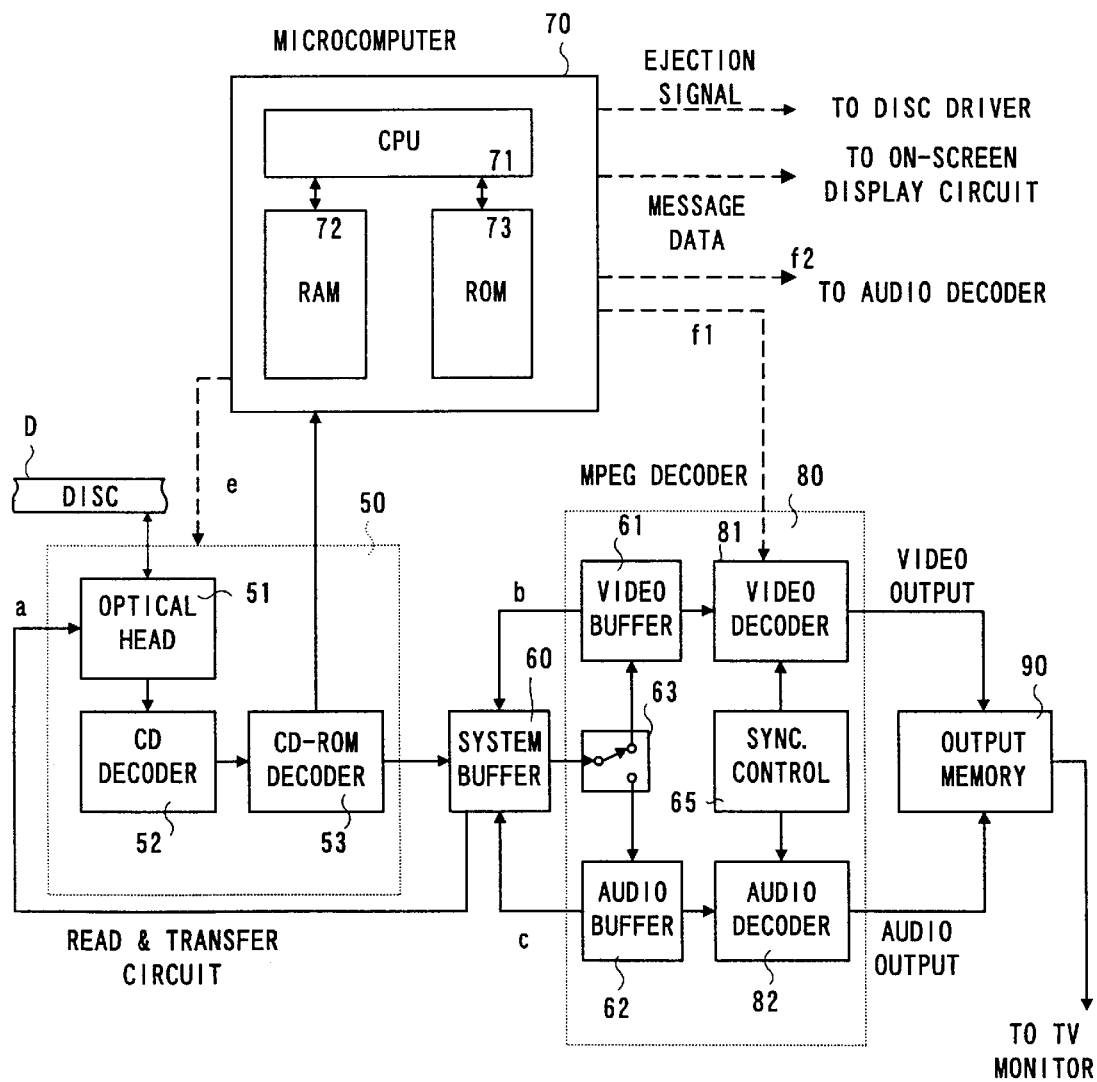
FIG. 5 is a block diagram showing one embodiment of a reproducing apparatus according to the present invention.

In an embodiment of the reproducing apparatus shown in FIG. 5, the bit steam recorded in the optical disc D as described above is read by a read/transfer circuit 50. More specifically, recorded data being read by an optical head 51 included in the read/transfer circuit 50 is demodulated into data of a CD format, that is, the compressed data with variable bit rate by a CD decoder 52 and a CD-ROM decoder 53, and the compressed data with the variable bit rate is transferred to the system buffer 60. In addition, as shown in detail in FIG. 7, the system buffer 60 includes a buffer memory 60b and a buffer controller 60a which controls writing and reading the buffer memory 60b. Therefore, a data amount of the system buffer 60 is controlled by the buffer controller 60a. More specifically, if the system buffer 60 is filled with the variable bit rate data, a read suspension is instructed to the read/transfer circuit 50 from the buffer controller 60 with utilizing a signal a, and if the data amount of the buffer memory 60b becomes less than a predetermined lower limit value, a restart of the reading is instructed to the read/transfer circuit 50 by the buffer controller 60a with utilizing the signal a.

The data stored in the system buffer 60 is read in response to data request signals b and c from respective buffer controllers for a video buffer 61 and an audio buffer 62 included in a known MPEG decoder 80, and stored in the video buffer 61 and the audio buffer 62. In addition, the compressed image data and the compressed sound data are changed-over by a switch 63 to be applied to the video buffer 61 and the audio buffer 62, respectively.

The compressed image data from the video buffer 61 is applied to a video decoder 81, and the compressed sound data from the audio buffer 62 is applied to the audio decoder 82. The video decoder 81 and the audio decoder 82 are synchronized with each other by a synchronization control circuit 65, and expands the data compressed according to the MPEG2 by a known method.

A video output outputted from the video decoder 81 and an audio output outputted from the audio decoder 80 are respectively stored in an output memory or output buffer 90. The output memory 90 is a frame memory, for example, and applies the image data and the sound data to a TV monitor (not shown) at every one frame. In addition, the output memory 90 may be provided in the MPEG decoder 80.

Furthermore, the MPEG decoder 80 and portions associated therewith have been well-known, and therefore, a detailed description will be omitted here.

In FIG. 5 embodiment, the index is extracted by a microcomputer 70 from the bit stream of the CD format being demodulated by the CD-ROM decoder 53. The microcomputer 70 controls the read/transfer circuit 50, the MPEG decoder 80 and etc.

More specifically, the microcomputer 70 includes a CPU 71 and associated RAM 72 and ROM 73. In a first step S1 shown in FIG. 6, the microcomputer 70 extracts the index from the bit stream. Then, in the step S1, the microcomputer 70 fetches the data of the index, i.e. the transfer rate and the buffer capacity.

In a succeeding step S2, the microcomputer 70 calculates and judges whether or not the capacity of the system buffer 60 (FIG. 5) is equal to or larger than the necessary memory capacity on the basis of the index, i.e. the buffer capacity and the transfer rate being read in the step S1, and therefore, the microcomputer 70 judges whether or not the data storage media, i.e. the program or application can be reproduced. If "YES" is judged in the step S2, in a step S3, the above described reproducing is performed. That is, the variable bit rate data in the system buffer 60 is processed by the video decoder 81 and the audio decoder 82, and the output data is obtained. Thereafter, in a step S4, the microcomputer 70 judges whether or not a further program or application to be reproduced exists. If there is the further program or application, the process returns to the step S2, and otherwise the operation is terminated.

If it is judged that the data storage media, i.e. the program or application can not be reproduced in the step S2, the microcomputer 70 applies message data to an on-screen display circuit (not shown), whereby the message can be displayed on a screen of the TV monitor. That is, on the TV monitor, the message "this optical disc (or program or application) can not be reproduced. Is the simple reproduction requested?", for example, is displayed. If an operator or user designates "simple reproduction" in response to such the message, "YES" is determined in a step S5, and then, in a next step S6, the simple reproduction is performed.

In addition, the simple reproduction is a reproducing method that during a time that the decoding operation (data processing) is suspended due to the lack of the data in the system buffer 60, the data stored in the output memory 90 at that time is repeatedly outputted. In a case where the output data of a moving picture, in the simple reproduction, a still picture is displayed during a time that the decoding operation is suspended. In a case of the sound data, a sound output is muted during the time.

Figure 7:
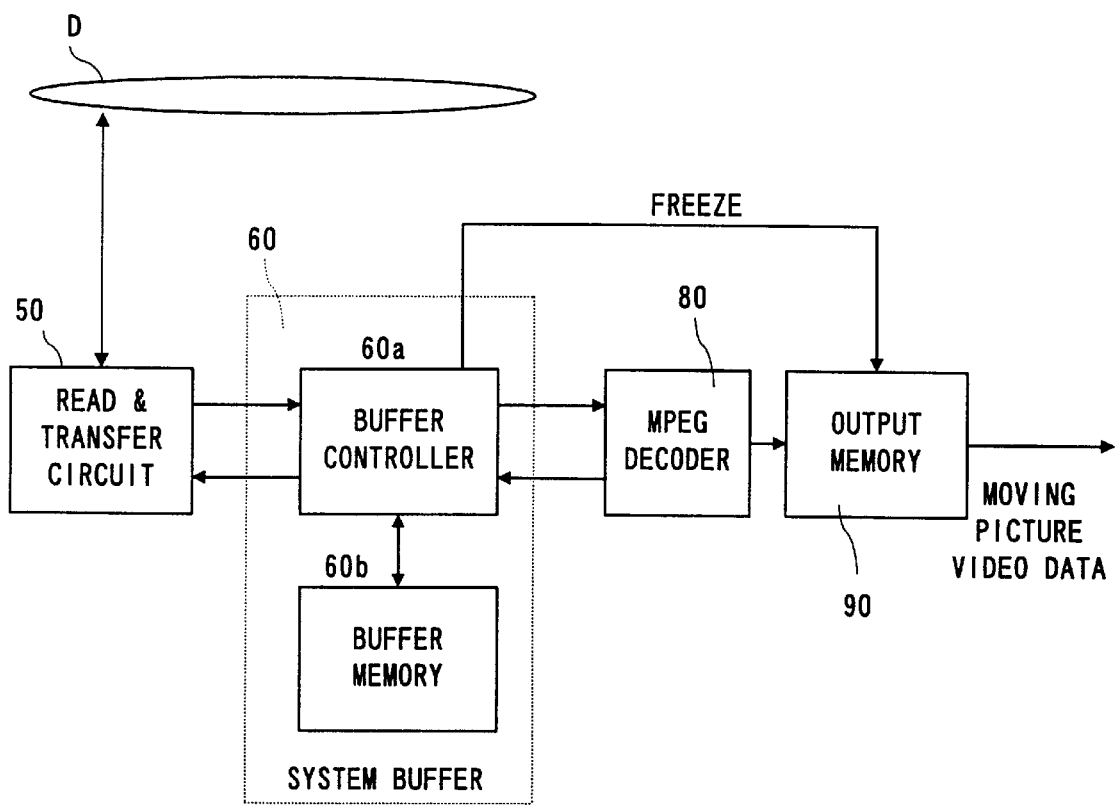
FIG. 7 is a block diagram showing one example of a reproducing apparatus capable of performing a simple reproduction.

In a case where the simple reproduction is performed as shown in FIG. 7, the buffer controller 60a of the system buffer 60 applies a freeze signal to the output buffer 90 at a time that the buffer memory 60b becomes empty. Therefore, the output buffer 90 repeatedly outputs the data being stored therein at that time in response to the freeze signal. If it is detected by the buffer controller 60a that the data of a predetermined amount is stored in the buffer memory 60b, the freeze signal is disabled, and therefore, a moving picture is reproduced again.

In addition, if the user does not designate "simple reproduction", the microcomputer 70 which determines that the data storage media or the program or application can not be reproduced outputs an eject signal to a disc driver (not shown), and a read stop command signal to the read/transfer circuit 50, and command signals f1 and f2 for stopping the decoding operations to the video decoder 81 and the audio decoder 82.

Figure 8:
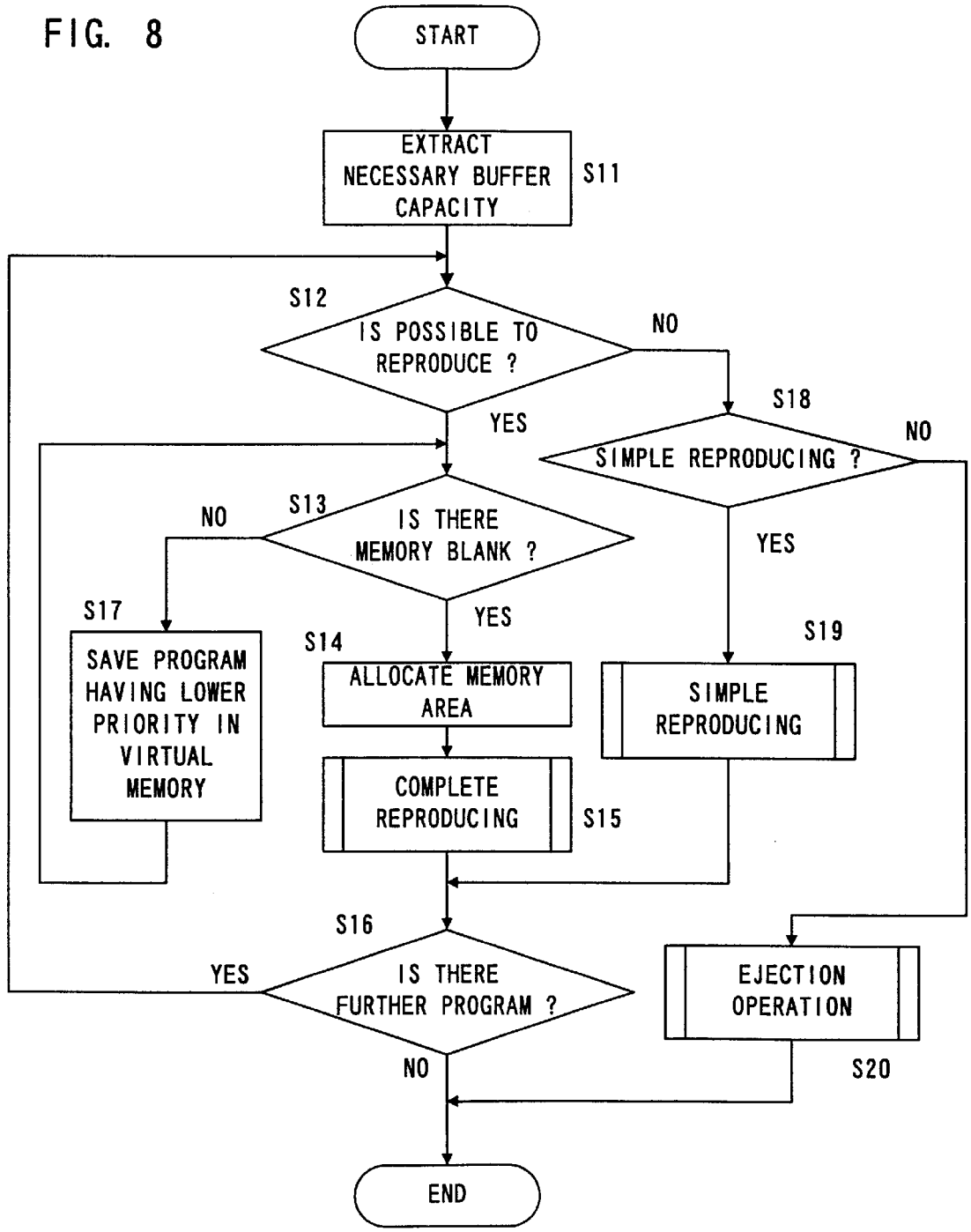
FIG. 8 is a flowchart showing another example of the operation of FIG. 5 embodiment.

A different operation of FIG. 5 embodiment is shown in FIG. 8. FIG. 8 embodiment is constructed such that the variable bit rate data outputted from the CD-ROM decoder 53 can be stored in not only the system buffer 60 but also a working memory for the microcomputer 70, that is, the RAM 72. Therefore, in this embodiment, the buffer capacity or memory capacity that is a reference in judging whether or not the data storage media or the program or application can be reproduced in a step S12 in FIG. 8 is a total capacity of the capacity of the system buffer 60 and a capacity of the working memory. Therefore, in the step S12, it is determined whether or not the necessary buffer capacity is less than the total capacity. If "YES" is determined in the step S12, the microcomputer 70 determines whether or not there is a blank area of a necessary capacity for reproducing the program or application in the memory.

Figure 9:
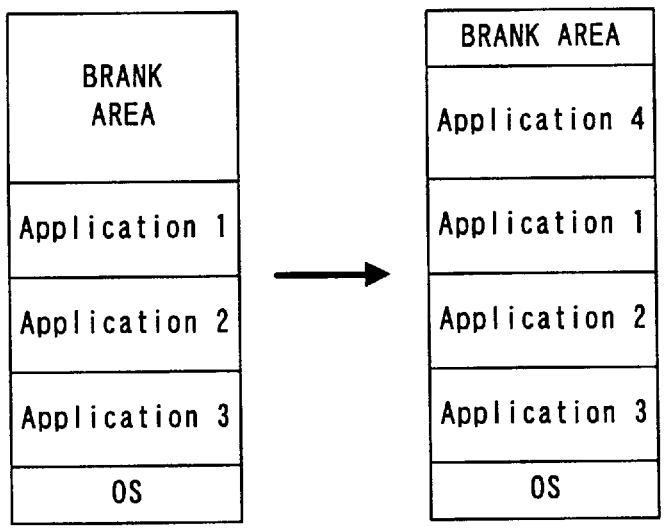
FIG. 9 is an illustrative view showing a memory allocation of a case where there is a blank area in a memory in FIG. 8 embodiment.

If "YES" is determined in the step S13, in a next step S14, the microcomputer 70 stores an application ("application 4", in an example shown) in the blank area as shown in FIG. 9. That is, in the step S14, memory areas are allocated. Thereafter, steps S15 and S16 similar to the steps S3 and S4 of FIG. 6 are executed.

Figure 10:
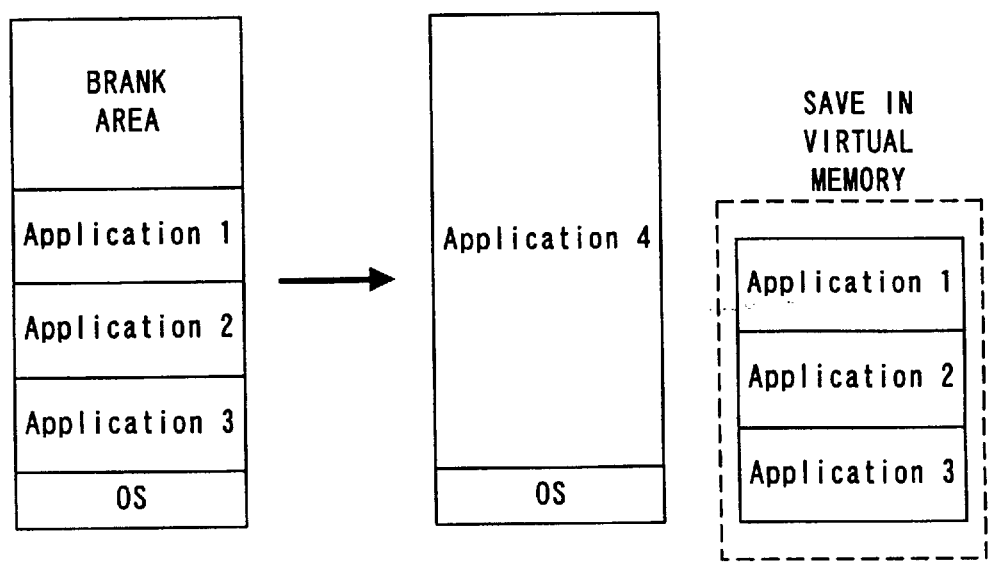
FIG. 10 is an illustrative view showing a memory allocation of a case where no blank area exists in the memory in FIG. 8 embodiment.

In addition, if "NO" is determined in the step S13, that is, if it is determined that the total capacity is larger than the necessary buffer capacity but there is no blank area in the memory, a step S17 is executed. In the step S17, other applications being stored in the working memory are saved in a virtual memory such as a fixed disc, thereby to secure a blank area in the memory. The applications being saved at that time have lower priorities. That is, in the step S17, according to the priority of the application, the application is saved in the virtual memory so that the necessary memory capacity (buffer capacity) can be secured. Accordingly, in such a case, in the step S14, the memory allocation is implemented as shown in FIG. 10.

According to FIG. 8 embodiment, it is possible to utilize not only the system buffer 60 but also the working memory of the microcomputer 70 for the decoder 80, a possibility that "NO" is determined in the step S12 is reduced.

Figure 6:
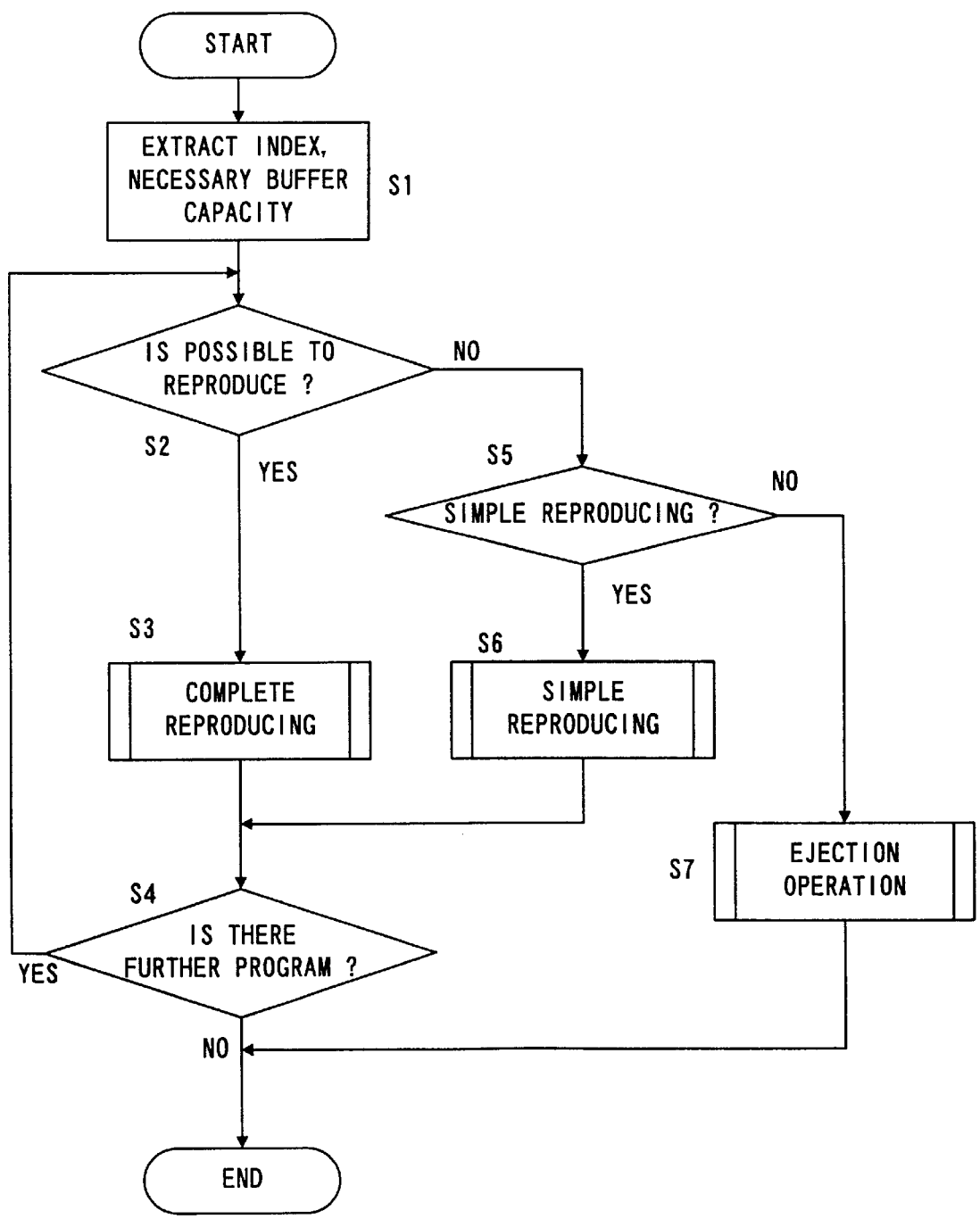
FIG. 6 is a flowchart showing one example of an operation of FIG. 5 embodiment.

In addition, in the above described FIG. 6 and FIG. 8 embodiments, in the step S1 and the step S11, the index extracted from the CD-ROM decoder 53, i.e. the transfer rate and the necessary buffer capacity corresponding to the transfer rate are fetched by the microcomputer 70. In contrast, if the index includes the rate difference characteristic, in the step S1 or S11, it is necessary to calculate the necessary buffer capacity and the transfer rate on the basis of the aforementioned equation in accordance with the rate difference characteristic. However, the following operation is similar to the above described operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording apparatus for recording data of a variable bit rate in a data storage medium, comprising:
    data output means for outputting variable bit rate data to be recorded;
    index output means for outputting an index including capacity associate data associated with a necessary memory capacity based upon a transfer rate from the data storage medium to a memory in a reproducing apparatus and the variable bit rate;
    bit stream generating means for generating a bit stream including said index and said variable bit rate data to be recorded; and
    recording means for recording said bit stream in said data storage medium.

2. The recording apparatus according to claim 1, wherein said index output means includes a buffer capacity calculator for outputting capacity data indicative of the necessary memory capacity based upon said variable bit rate and said transfer rate.

3. The recording apparatus according to claim 1, wherein said index output means includes a rate difference calculator for outputting rate difference characteristic data indicative of a variation in time of a difference between said variable bit rate and said transfer rate.

4. The recording apparatus according to any one of claims 1 to 3, wherein said data output means includes an encoder for compressing moving picture data and for outputting compressed moving picture data of the variable bit rate.

5. The recording apparatus according to claim 1, wherein said recording means records said index in a predetermined area of said data storage medium.

6. The recording apparatus according to claim 5, wherein said data storage medium includes an optical disc, and said predetermined area is a lead-in area.

7. A method for recording data of a variable bit rate in a data storage medium, comprising steps of:

(a) outputting variable bit rate data to be recorded;

(b) outputting an index including capacity associate data associated with a necessary memory capacity based upon a transfer rate from a data storage media to a memory in a reproducing apparatus and said variable bit rate;

(c) generating a bit stream including said index and said variable bit rate data to be recorded; and (d) recording said bit steam in said data storage media.

8. The recording method according to claim 7, wherein said step (b) includes outputting capacity data indicative of said necessary memory capacity based upon said variable bit rate and said transfer rate.

9. The recording method according to claim 7, wherein said step (b) includes outputting rate difference characteristic data indicative of variation in time of a difference between said variable bit rate and said transfer rate.

10. The recording method according to any one of claims 7 to 9, wherein said step (b) includes outputting compressed moving picture data of the variable bit rate by compressing the moving picture data.

11. The recording method according to claim 7, wherein said step (d) includes recording said index data in a predetermined area of said data storage media.

12. A reproducing apparatus for reproducing a data storage medium having a bit stream recorded thereon, the bit stream including data of a variable bit rate and an index, the index including capacity associate data associated with a necessary memory capacity, the apparatus comprising:

a read and transfer circuit for reading said bit stream from said data storage medium;

extracting means for extracting said index from said bit stream; and judging means for judging on the basis of at least said index whether or not said data storage medium can be reproduced.

13. The reproducing apparatus according to claim 12, wherein said index includes a transfer rate and a necessary memory capacity corresponding to the transfer rate.

14. The reproducing apparatus according to claim 12, wherein said index includes a rate difference characteristic data indicative of a variation in time of a difference between the variable bit rate and a transfer rate from the data storage medium to a memory of a reproducing apparatus, and wherein said judging means calculates the transfer rate and a necessary memory capacity on the basis of said rate difference characteristic.

15. The reproducing apparatus according to claim 13 or 14, further comprising a first memory having a first capacity.

16. The reproducing apparatus according to claim 13 or 14, further comprising a first memory having a first capacity and a second memory having a second capacity, and wherein the apparatus has a total capacity equal to the sum of said first capacity of said first memory and said second capacity of said second memory.

17. The reproducing apparatus according to claim 16, wherein said judging means judges that said data storage medium can be reproduced if the necessary memory capacity is smaller than said total capacity.

18. The reproducing apparatus according to claim 17, further comprising a determination means for determining whether or not there is a blank area in at least one of said first memory and said second memory when said necessary memory capacity is smaller than said total capacity, and means for securing a blank area by saving information being stored in at least one of said first memory and said second memory when there is no blank.

19. The reproducing apparatus according to claim 18, wherein said means for securing saves information having a lower priority.

20. The reproducing apparatus according to claim 12, further comprising a memory for storing the variable bit rate data in the bit stream, a data processing means for processing data read from said memory, and an output memory for storing data outputted from said data processing means.

21. The reproducing apparatus according to claim 20, further comprising means for repeatedly outputting data stored in said output memory at a time that the data processing by said data processing means is suspended due to the amount of data stored in said memory being less than a predetermined amount.

22. A method for reproducing a data storage medium having a bit stream recorded thereon, the bit stream including data of a variable bit rate and an index, the index including capacity associate data associated with a necessary memory capacity, the method comprising:

(a) reading said bit stream from said data storage medium;

(b) extracting the index from said bit stream; and (c) judging whether or not said data storage media can be reproduced on the basis of at least said index.

23. A reproducing apparatus for reproducing a data storage medium, comprising:

a buffer memory;

means for reading variable bit rate data from the data storage medium and for transferring said variable bit rate data to the buffer memory;

a buffer controller for controlling writing and reading of said variable bit rate data into and from said buffer memory;

a decoder for decoding said variable bit rate data read from said buffer memory to produce output data;

an output memory for storing the output data from said decoder; and means for repeatedly outputting the output data stored in said output memory when the amount of data stored in said buffer memory is less than a predetermined amount.

24. A method for reproducing variable bit rate data stored in a data storage medium, comprising:

(a) reading the variable bit rate data from said data storage media;

(b) transferring the variable bit rate dat to a buffer memory;

(c) decoding said variable bit rate data read from said buffer memory to produce output data;

(d) storing the output data from said decoder in an output memory; and (e) repeatedly outputting the output data stored in said output memory when the amount of data stored in said buffer memory is less than a predetermined amount.

* * * * *